United States Patent [19]

Baba et al.

[11] 4,357,397

[45] Nov. 2, 1982

[54] BRAZING FIN STOCK FOR USE IN ALUMINUM BASE ALLOY HEAT EXCHANGER

[75] Inventors: Yoshio Baba; Zenichi Tanabe, both Nagota; Toshiyasu Fukui; Hiroshi Ikeda, both of Tayooke, all of Japan

[73] Assignee: Sumitomo Light Metal Industries, Ltd., Tokyo, Japan

[21] Appl. No.: 172,729

[22] Filed: Jul. 28, 1980

[30] Foreign Application Priority Data

Mar. 31, 1980 [JP] Japan .................... 55-40197

[51] Int. Cl.³ .................. B32B 15/01; B32B 15/20
[52] U.S. Cl. .................. 428/654; 75/146; 148/11.5 A
[58] Field of Search .............. 428/654; 75/146, 147, 75/148; 148/11.5 A

[56] References Cited

U.S. PATENT DOCUMENTS

| | | | | |
|---|---|---|---|---|
| 2,602,413 | 7/1952 | Miller | .................. | 75/146 |
| 3,498,849 | 3/1970 | Worthington et al. | .............. | 428/654 |
| 4,238,233 | 12/1980 | Yamada et al. | .................. | 75/146 |

FOREIGN PATENT DOCUMENTS 514030 7/1976 U.S.S.R. .................. 75/146

OTHER PUBLICATIONS

Lyman, T., ed. *Metals Handbook* vol. *1*, 8th Edition, Am. Soc. for Metals, Metals Park, Ohio, pp. 916–917 (1961).

*Primary Examiner*—Michael J. Lewis
*Attorney, Agent, or Firm*—Blanchard, Flynn, Thiel, Boutell & Tanis

[57] ABSTRACT

A sacrificial brazing fin stock for use in an aluminum base alloy heat exchanger comprises an aluminum base alloy core having a grain size of 100 μm or more and consisting essentially of 0.5 to 2 wt. % manganese plus iron, said manganese being more than iron, 0.1 to 0.7 wt. % zinc, 0.001 to less than 0.02 wt. % tin, and balance aluminum and a cladding consisting of one material selected from an Al-Si base alloy and an Al-Si-Mg base alloy.

The above fin stock protected a main tube of the heat exchanger from a pitting corrosion and led to a greatly expanded use of the aluminum base alloy heat exchanger.

6 Claims, 2 Drawing Figures

BRAZING FIN STOCK FOR USE IN ALUMINUM BASE ALLOY HEAT EXCHANGER

BACKGROUND OF THE INVENTION

The present invention relates to a brazing fin stock for use in an aluminum base alloy heat exchanger, and more particularly to a brazing fin stock having a sacrificial anode effect so that the tube- or plate-shaped fluid passage member of the heat exchanger is protected from corrosion.

Air condensers or evaporators for car air conditioners have been normally constructed by vacuum soldering fin members made of brazing sheets to main tube members through which a coolant flows and which have been formed from a porous aluminum or Al-Mn type alloy by the process of extrusion. Conventionally, the brazing sheet for the fin member is fabricated from a core alloy of 3003 aluminum alloy or 6951 aluminum alloy and a cladding alloy of Al-Si-Mg type alloy.

In use such a conventional heat exchanger is subjected to considerable corrosion damage when the air-cooled side of the heat exchanger is exposed to a severely corrosive environment, and, thus the applications of such conventional heat exchangers are limited to a narrow range. The corrosion encountered with conventional heat exchangers is illustrated by FIG. 1. When the heat exchanger wherein a main tube member 1 and a fin member 2 are joined to each other at a fillet portion 3 by means of vacuum soldering is fabricated from the conventional materials, the fillet portion 3 becomes more cathodic and a corrosion-current flows in the direction of the arrow so that pitting corrosion 4 occurs in the main tube member 1.

SUMMARY OF THE INVENTION

It is therefore an object of the present invention to overcome the foregoing disadvantages or problems, and more particularly pitting corrosion of the main tube member. In accordance with the present invention, improved fin stocks having a sacrificial anode effect have been developed from special materials. The fin stock comprises an aluminum base alloy core having a grain size of 100 $\mu$m or more and consisting essentially of 0.5 to 2 wt.% manganese plus iron, the amount of said manganese being more than the amount of iron, 0.1 to 0.7 wt.% zinc, 0.001 to less than 0.02 wt.% tin, and the balance aluminum, and a cladding consisting of one material selected from an Al-Si base alloy and an Al-Si-Mg base alloy. By using the fin members made of the above fin stocks according to the present invention in the aluminum base alloy heat exchanger, the main tube members are protected from pitting corrosion so that the useful life of the heat exchanger becomes remarkably long and the heat exchanger can be used in many applications.

Additional objects, features and advantages of this invention will appear more fully from the following description.

DETAILED DESCRIPTION

Figure 1:
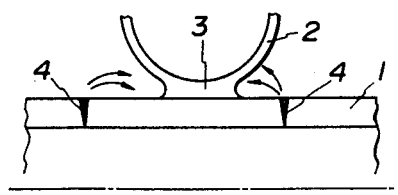
FIG. 1 illustrates a corrosion state of part of a conventional heat exchanger.

The fin stock of the present invention comprises an aluminum base alloy core having a grain size of 100 $\mu$m or more and consisting essentially of 0.5 to 2 wt.% manganese plus iron, the amount of said manganese being more than the amount of iron, 0.1 to 0.7 wt.% zinc, 0.001 to less than 0.02 wt.% tin, and balance aluminum and a cladding consisting of one material selected from an Al-Si base alloy and an Al-Si-Mg base alloy.

In the aluminum base alloy core, zinc serves to make fin members more anodic and prevent the pitting corrosion of the main tube member. When the zinc content is less than 0.1 wt.%, the effect does not reach the required level. On the other hand, when its content is more than 0.7 wt.%, a large amount of zinc evaporates during the vacuum brazing process and solderability is reduced.

Manganese and iron enhance the strength of the fin stock, but when the combined content of these elements is less than 0.5 wt.%, the effect of increasing the strength is insufficient. On the other hand, when the total content of these elements exceeds 2 wt.% giant compounds tend to form in the ingot and lower the effect imparted by manganese and iron. The fin stock contemplated by the invention is characterized by the core having a grain size of 100 $\mu$m or more and such grain size can be achieved when the manganese content is greater than the iron content. Thus, the manganese content should be greater than the iron content.

Tin, in combination with zinc, serves to make fin members anodic to the main tube members both before and after the vacuum brazing process, and prevents the pitting corrosion of the main tube members. When the tin content is less than 0.001 wt.%, the above-mentioned effect does not reach the level contemplated by the present invention. On the other hand, when the content is 0.02 wt.% or more, the fin members become excessively anodic and excessive self-corrosion tends to occur. This excessive self-corrosion shortens the fin life in service. Further excess tin lowers not only the strength of the fin stock but also the hot workability of the aluminum base alloy ingot for the core, so that the cladding process is made very difficult.

Grain size of the core of the fin stock according to the present invention should be 100 $\mu$m or more, since a grain size not exceeding 100 $\mu$m decreases buckling resistance below the required level. In order to develop a grain size of 100 $\mu$m or more in the core of the fin stock, the core alloy described above is hot rolled at a temperature of 450° to 550° C. and recrystallization annealed by heating to a temperature of at least 300° C. for 30 minutes or more.

The above special aluminum base alloy core can further contain as incidental impurities silicon up to 1 wt.%, magnesium up to 0.5 wt.%, copper up to 0.3 wt.%, chromium up to 0.3 wt.%, titanium 0.3 wt.%, zirconium up to 0.3 wt.%, boron up to 0.1 wt.% and/or gallium up to 0.1 wt.% without any substantial reduction of the desired properties.

The cladding layer for the above core is made of Al-Si base alloy or Al-Si-Mg base alloy cladding material. As a suitable cladding material for a brazing process using a flux, Al-5-15 wt.% Si is employed, and for a vacuum brazing process Al-5-15 wt.% Si-0.1-2 wt.% Mg is employed. Further, for a normal brazing process in atmospheric pressure, Al-5-15 wt.% Si-0.001-0.2 wt.% Bi-0.001-0.1 wt.% Be is preferably employed.

The cladding ratio of the brazing fin stock according to the present invention is preferably 5 to 20%.

The selection and combination of materials described above for the core and the cladding provide a highly improved brazing fin stock having a very good degree of workability, a high yield, and a sacrificial anode effect sufficient to afford the desired cathodic protection to main tube members.

The following examples and test results for the present invention are described together with comparative examples.

In these examples, aluminum alloys having compositions shown in Table 1 below were employed as core materials.

TABLE 1

| | No. | Chemical Composition (wt. %) Balance: Al | | | | | | | | |
|---|---|---|---|---|---|---|---|---|---|---|
| | | Mn | Fe | Zn | Sn | Si | Cu | Mg | Cr | Ti |
| Core alloys | 1 | 0.40 | 0.30 | 0.6 | 0.003 | 0.15 | 0.02 | 0.02 | 0.05 | 0.01 |
| according to the | 2 | 0.50 | 0.45 | 0.20 | 0.018 | 0.10 | 0.01 | 0.10 | 0.01 | 0.05 |
| present invention | 3 | 0.8 | 0.40 | 0.50 | 0.005 | 0.10 | 0.01 | 0.01 | 0.02 | 0.02 |
| | 4 | 1.2 | 0.35 | 0.40 | 0.015 | 0.08 | 0.02 | 0.05 | 0.01 | 0.02 |
| | 5 | 1.5 | 0.25 | 0.40 | 0.015 | 0.10 | 0.05 | 0.02 | 0.01 | 0.01 |
| Alloys for comparison | 6 | 0.01 | 0.15 | 0.50 | 0.01 | 0.07 | 0.01 | 0.01 | 0.01 | 0.01 |
| | 7 | 1.0 | 0.50 | 0.4 | 0.06 | 0.12 | 0.02 | 0.02 | 0.02 | 0.01 |
| | 8 | 1.2 | 0.30 | 1.5 | 0.03 | 0.10 | 0.10 | 0.01 | 0.02 | 0.02 |
| | 9 | 1.2 | 0.40 | — | — | 0.15 | 0.15 | 0.05 | 0.01 | 0.02 |
| | 10 | 1.5 | 0.8 | 0.50 | 0.01 | 0.20 | 0.01 | 0.10 | 0.01 | 0.01 |
| | 11 | 0.20 | 0.20 | 0.40 | 0.01 | 0.15 | 0.02 | 0.01 | 0.01 | 0.01 |
| | 12 | 0.30 | 0.40 | 0.40 | 0.01 | 0.10 | 0.02 | 0.01 | 0.01 | 0.01 |
| | 13 | 1.0 | 0.30 | 0.05 | 0.01 | 0.10 | 0.01 | 0.02 | 0.01 | 0.01 |
| | 14 | 1.0 | 0.35 | 0.8 | 0.01 | 0.12 | 0.01 | 0.02 | 0.01 | 0.01 |
| | 15 | 1.0 | 0.25 | 0.20 | 0.0005 | 0.12 | 0.01 | 0.02 | 0.01 | 0.01 |

Core layers made of each of the alloys listed in Table 1 were clad with a cladding layer of Al-10 wt.% Si-1.5 wt.% Mg on both sides of each core layer in order to produce a brazing fin stock. Casting, rolling workability and corrugating formability were examined on each brazing fin stock, and the results are shown in Table 2 below.

TABLE 2

| | Textural Defect[1] of Ingot | Rolling[2] Workability | Corrugating[3] Formability of Fin Stock |
|---|---|---|---|
| 1 | Good | Good | Good |
| 2 | Good | Good | Good |
| 3 | Good | Good | Good |
| 4 | Good | Good | Good |
| 5 | Good | Good | Good |
| 6 | Good | Good | Uneven Fin Pitch |
| 7 | Segregation of Sn Base Compound | Occurrence of Considerable Edge Crack | Good |
| 8 | Good | Occurrence of Edge Crack | Good |
| 9 | Good | Good | Good |
| 10 | Formation of Giant Intermetallic Compound | Good | Poor Louver Cutting |
| 11 | Good | Good | Poor Louver Cutting |
| 12 | Good | Good | Poor Louver Cutting |
| 13 | Good | Good | Good |
| 14 | Good | Good | Good |
| 15 | Good | Good | Good |

Notes:
[1]Test specimens were cut off from the side end portions of the respective alloys above and were examined by electron microscopy.
[2]This was evaluated by occurrence of edge cracks after hot rolling.
[3]Fin stocks 0.16 mm thick were formed into corrugated configurations having louvers and the configuration uniformities were evaluated.

Figure 2:
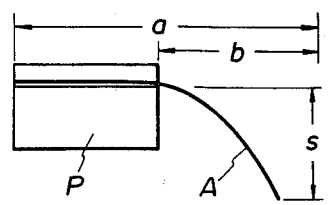
FIG. 2 illustrates an embodiment of a droop resistance test.

Brazing fin stocks (25 mm in width × 70 mm in length × 0.16 mm in thickness) with cores having the various grain sizes shown in Table 3 were produced by adjusting production conditions, such as the conditions for soaking the ingots, and the conditions for hot rolling and intermediate annealing. Buckling resistance was determined by measuring the droop amounts S of each fin stock A after fixing one end of each fin stock A to a jig P, as shown in FIG. 2, and heating at 600° C. for 30 minutes. In FIG. 2, a and b show lengths of 70 mm and 30 mm, respectively. The results are shown in Table 3 below.

TABLE 3

| No. | Droop Amount of Fin Stock (mm) | | | |
|---|---|---|---|---|
| | <100 μm | 100–200 μm | 200–300 μm | >300 μm |
| 1 | 15 | 4 | 3 | 2 |
| 2 | 15 | 3 | 3 | 2 |
| 3 | 12 | 4 | 3 | 1 |
| 4 | 12 | 3 | 2 | 1 |
| 5 | 10 | 3 | 2 | 1 |
| 6 | >25 | >25 | >25 | >25 |
| 7 | 15 | 4 | 3 | 2 |
| 8 | 12 | 4 | 2 | 1 |
| 9 | 12 | 3 | 3 | 1 |
| 10 | 10 | 3 | 2 | 1 |
| 11 | >25 | 20 | 12 | 10 |
| 12 | 20 | 10 | 7 | 5 |
| 13 | 12 | 3 | 2 | 1 |
| 14 | 20 | 15 | 10 | 7 |
| 15 | 12 | 3 | 2 | 1 |

The above-mentioned brazing fin stocks comprising cores made of the aluminum base alloys Nos. 1 to 15 and claddings made of Al-10 wt.% Si-1.5 wt.% Mg were joined to tubes which were formed from A 1050 alloy or A 3003 alloy by a normal process of extrusion by means of vacuum brazing at a temperature of 600° C. for 3 minutes under a pressure of $10^{-5}$ torr, and heat exchanger units were thereby produced. In order to study the corrosion resistances of the thus-constructed heat exchanger units, alternate wet and dry tests were conducted by immersing each heat exchanger unit in a 3% NaCl solution (pH=3) at 40° C. for 30 minutes and then drying the same at 50° C. for 30 minutes. This procedure was continuously repeated for one month, and the maximum corrosion depth was measured on each heat exchanger unit. The results are shown in Table 4. Potentials indicated in the Table 4 are the potentials of the cores of the brazing fin stocks measured in 3% NaCl aqueous solution, using a saturated calomel standard electrode.

TABLE 4

| No. | Potential (V) | Maximum Corrosion Depth (mm) | |
| --- | --- | --- | --- |
| | | A1050 Tube | A3003 Tube |
| 1 | −0.88 | 0.41 | 0.21 |
| 2 | −0.83 | 0.50 | 0.25 |
| 3 | −0.85 | 0.47 | 0.23 |
| 4 | −0.88 | 0.40 | 0.20 |
| 5 | −0.85 | 0.40 | 0.20 |
| 6 | −0.87 | 0.42 | 0.23 |
| 7 | −0.96 | 0.40 | 0.18 |
| 8 | −0.90 | 0.41 | 0.19 |
| 9 | −0.68 | 0.80 | 0.65 |
| 10 | −0.88 | 0.42 | 0.22 |
| 11 | −0.86 | 0.41 | 0.20 |
| 12 | −0.86 | 0.40 | 0.21 |
| 13 | −0.74 | 0.80 | 0.60 |
| 14 | −0.88 | 0.40* | 0.20* |
| 15 | −0.76 | 0.80 | 0.58 |

Note:
*Occurrence of considerable self-corrosion of Fin Stock.

As can be seen from the above description, the present invention achieved the brazing fin stock having a greatly improved sacrificial anode effect, corrosion resistance, workability, and buckling resistance, and greatly expands the uses of aluminum alloy heat exchangers.

What is claimed is:

1. A brazing fin stock comprising a core clad with a cladding layer, said core having a grain size of 100 μm or more and being made of an aluminum base alloy consisting essentially of from 0.5 to 2 wt.% of manganese plus iron, wherein the amount of said manganese is greater than the amount of said iron and the amount of said iron being an amount effective to increase the strength of said core and to provide a grain size of said core of 100 μm or more, from 0.1 to 0.7 wt.% of zinc, from 0.001 to less than 0.02 wt.% of tin and the balance is aluminum, said cladding layer being made of an alloy consisting essentially of from 5 to 15 wt.% of silicon and the balance is aluminum.

2. A brazing fin stock comprising a core clad with a cladding layer, said core having a grain size of 100 μm or more and being made of an aluminum base alloy consisting essentially of from 0.5 to 2 wt.% of manganese plus iron, wherein the amount of said manganese is greater than the amount of said iron and the amount of said iron being an amount effective to increase the strength of said core and to provide a grain size of said core of 100 μm or more, from 0.1 to 0.7 wt.% of zinc, from 0.001 to less than 0.02 wt.% of tin and the balance is aluminum, said cladding layer being made of an alloy consisting essentially of from 5 to 15 wt.% of silicon, from 0.1 to 2 wt.% of magnesium and the balance is aluminum.

3. A brazing fin stock comprising a core clad with a cladding layer, said core having a grain size of 100 μm or more and being made of an aluminum base alloy consisting essentially of from 0.5 to 2 wt.% of manganese plus iron, wherein the amount of said manganese is greater than the amount of said iron and the amount of said iron being an amount effective to increase the strength of said core and to provide a grain size of said core of 100 μm or more, from 0.1 to 0.7 wt.% of zinc, from 0.001 to less than 0.02 wt.% of tin and the balance is aluminum, said cladding layer being made of an alloy consisting essentially of from 5 to 15 wt.% of silicon, from 0.001 to 0.2 wt.% of bismuth, from 0.001–0.1 wt.% of beryllium and the balance is aluminum.

4. A brazing fin stock according to claim 1, claim 2 or claim 3, in which said aluminum base alloy for said core contains at least 0.25 wt.% of iron.

5. A brazing fin stock according to claim 1, claim 2 or claim 3, in which said aluminum base alloy for said core contains from 0.25 to 0.45 wt.% of iron.

6. A brazing fin stock as claimed in claim 1, claim 2 or claim 3, in which said core has been prepared by hot rolling said aluminum base alloy at a temperature of from 450° to 550° C. and then recrystallization annealed by heating to a temperature of at least 300° C. for 30 minutes or more until the grain size is 100 μm or more.

* * * * *